United States Patent [11] 3,560,787

| [72] | Inventors | Burton R. Clay<br>Wayland;<br>Theodore A. Haddad, Lexington, Mass. |
| [21] | Appl. No. | 671,181<br>Division of Ser. No. 353,009, Mar. 18, 1964,<br>Patent No. 3,454,900. |
| [22] | Filed | Aug. 21, 1967 |
| [45] | Patented | Feb. 2, 1971 |
| [73] | Assignee | The United States of America as represented by the Secretary of the Navy<br>by mesne assignments |

[54] FLASH LAMP
5 Claims, 9 Drawing Figs.
[52] U.S. Cl. .................................................. 313/112,
313/36, 313/220; 331/94.5
[51] Int. Cl. .................................................. H01j 5/16
[50] Field of Search ........................................ 313/110,
216, 217, 220, 35, 36, 112; 331/94.5

[56] References Cited
UNITED STATES PATENTS

| 2,831,152 | 4/1958 | Dziergwa | 313/220X |
| 3,210,687 | 10/1965 | Boyd et al. | 331/94.5 |
| 3,222,615 | 12/1965 | Holly | 331/94.5 |
| 3,262,004 | 7/1966 | Keller | 313/220 |
| 2,353,668 | 7/1944 | Hinman | 313/35 |
| 3,431,511 | 3/1969 | Fyler | 331/94.5 |
| 2,329,584 | 9/1943 | Bourne | 313/35 X |

Primary Examiner—Raymond F. Hossfeld
Attorneys—R. I. Tompkins and R. J. Miller

ABSTRACT: The invention disclosed herein provides for an improved flash lamp having an extremely high intensity which incorporates cylindrical inner and outer walls and has end members for sealing the walls and defining the space therebetween to confine the gas, and includes a coating on the outer walls specifically passing portions of the radiation so that the flash lamp generates a flash inwardly directed which contains desired bands of radiation.

PATENTED FEB 2 1971
3,560,787
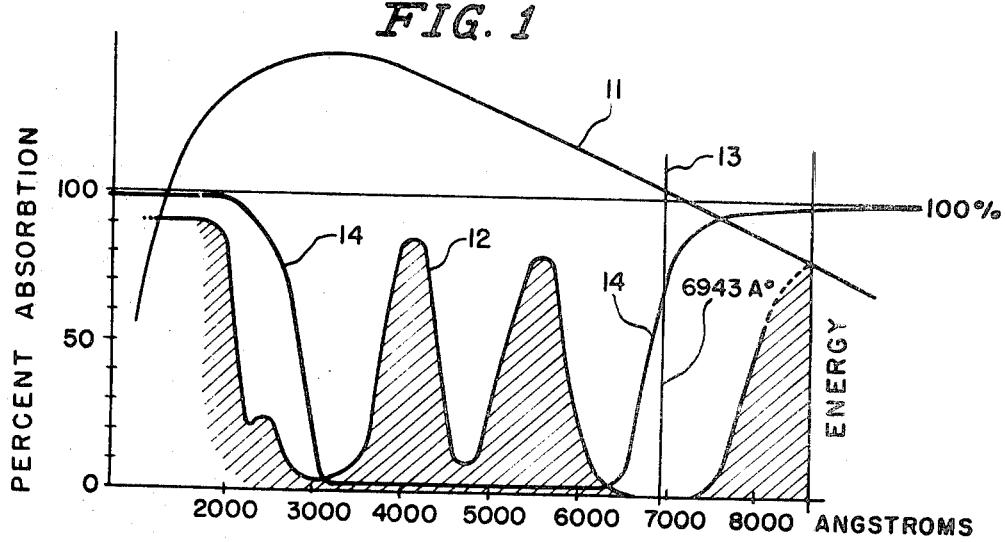
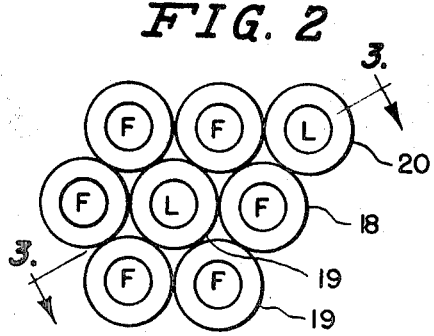
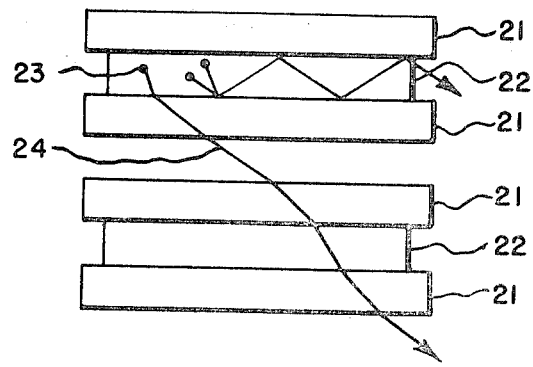
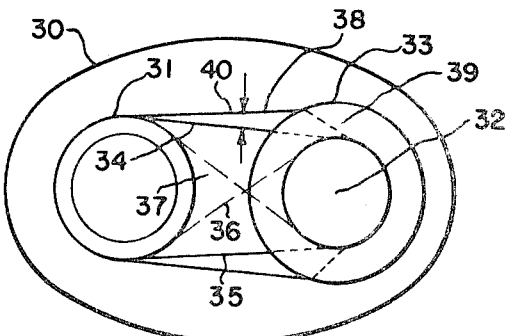
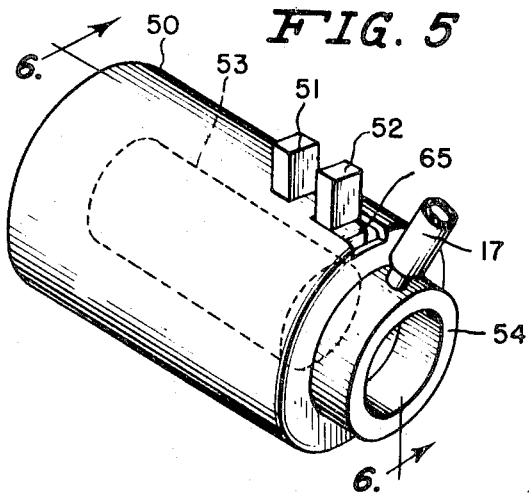
INVENTORS
Burton R. Clay
Theodore A. Haddad
By Richard J. Miller Atty.

INVENTORS
Burton R. Clay
Theodore N. Haddad
By Richard J. Miller Atty.

FLASH LAMP

This application is a division of Ser. No. 353,009, filed 18 Mar. 1964.

This invention relates to a laser system and more specifically to means for cooling a lasable material and selectively energizing the lasable material by passing pump light through the cooling liquid.

With the current state of the art of lasers many problems exist which limit the output of such devices. Among these are the heating effects of utilizing a high energy pumping source having a broad spectrum of radiation to drive a lasable material.

It is therefore an object of this invention to provide an improved laser amplifier which more efficiently utilizes pumped energy.

It is a further object of this invention to provide a liquid cladding for a lasing material.

It is still further object of this invention to provide a cladding for a laser material which selectively passes radiation to the material to be lased.

It is yet a further object of this invention to provide a means for nesting ruby lasers and flash lamps with a reduced off axis mode of propagation effect.

It is another object of this invention to provide an improved cooling system for a lasable material.

Yet another object of this invention is to provide an improved laser system comprising a pumping source for providing electromagnetic radiation having a frequency distribution including first and second bands of frequencies; a lasable material capable of being lased by radiation in said first band to emit coherent radiation at a given frequency; and a liquid cladding medium interposed between said source and said material for passing said first band of frequencies and absorbing said second band of frequencies.

Other objects, advantages and novel features of the invention will become apparent from the following detailed description of the invention when considered in conjunction with the accompanying drawings wherein:

FIG. 1 is a graph showing certain relationships which are helpful in understanding the invention;

FIG. 2 shows schematically one embodiment of the invention including a nested arrangement of laser rods and flash lamps;

FIG. 3 is a sectional view along lines 3–3 in FIG. 2;

FIG. 4 show a single flash lamp and ruby combination in an elliptical reflector;

Figure 6:
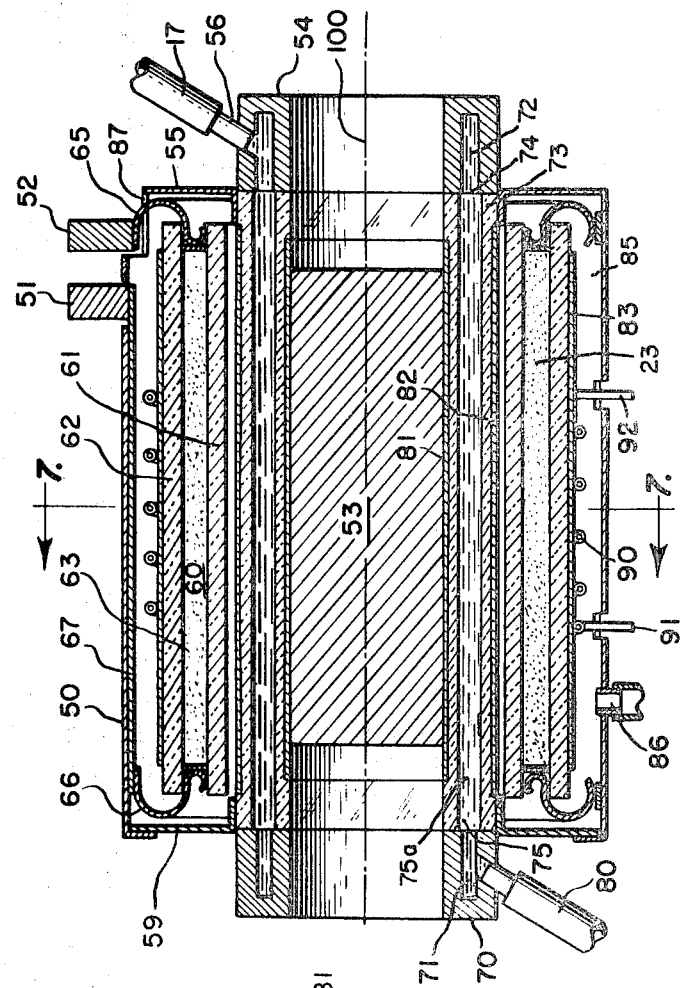

FIG. 5 5 is a perspective view of another embodiment of the invention;

FIG. 6 is a longitudinal sectional view along lines 6–6 in FIG. 5; and

Figure 7:
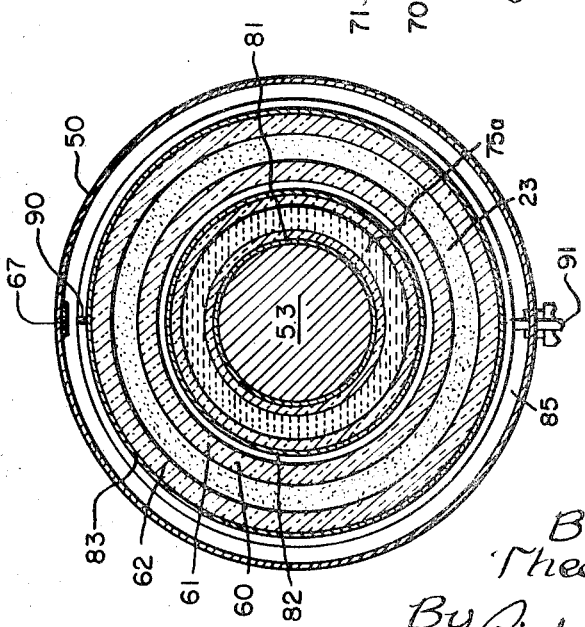

FIG. 7 is a cross-sectional view along lines 7–7 of FIG. 6.

FIG. 1 shows a graph in which the scale of the horizontal axis is wavelength in Angstroms, the left vertical axis is in percentages of absorption, and the right vertical axis is in arbitrary energy units.

This graph is shown to better demonstrate the advantages of the invention incorporated within the application. The curve 11 represents a somewhat idealized black-body radiation at the temperature normally experienced in a Xenon flash lamp used in laser systems. It should be noted that the distribution of energy peaks somewhere in the area between 2,000 and 4,000 Angstroms and tends to decrease either side thereof. The energy distribution of the useful absorption spectrum of the typical ruby laser material is shown by curve 12 which delineates a shaded portion of the graph. It should be noted that the energy distribution peaks in the neighborhood of 4,000 Angstrom and 5,500 Angstroms going to substantially zero at the output of a ruby laser designated by the vertical line 13 at 6,934 Angstroms. Absorption bands below 2,000 Angstroms in the ultraviolet range and above 7,500 Angstroms in the infrared range are not useful for inducing laser action in a typical ruby laser material.

The Xenon flash lamp has been found to be a very suitable source of pumping energy for a ruby laser because it produces substantial luminous energy at the useful 4,000 and 5,400 Angstroms absorption bands in a typical ruby laser. These pumping energies are particularly efficient for inverting the population within the ruby and for causing it to lase. However, the energy concentrations in the infrared and ultraviolet range do not aid in the population inversion and do hinder proper operation of a system by causing excessive heating and other deleterious effects. A line 14 shows the relative absorption characteristics of the liquid cladding utilized in this invention to selectively pass energy in the desired pumping bands and to reject or absorb energy in the infrared and ultraviolet ranges. It should be noted that there is a relatively high degree of absorption of the liquid at the ruby laser wave length. The liquid is provided as a cladding, as hereinafter shown, and has many desirable advantages. One such advantage is shown in FIGS. 2 and 3 wherein a series of flash lamps 18 are arranged about a ruby laser 19. A nesting of such flash lamps about the laser ruby provides for an arrangement whereby additional rubies may be stacked as shown by laser 20 in such a manner that each laser rod is substantially surrounded by a cluster of six adjacent lamps. The longitudinal sectional view in FIG. 3 shows the advantage of a liquid cladding 21 about rubies 22. The point 23 represents a possible source of spontaneous emission and the path thereof is shown by the line 24. A cladding is provided which has an index of refraction higher than the atmosphere but lower than the ruby. Since the cladding 21 has an absorption at the ruby lasing frequency which is quite high the energy projected along path 24 is considerably reduced by passing through the cladding, and since it passes through two claddings before it reaches another ruby its energy is reduced an additional 50—60 percent so that the net amount of energy arriving at another ruby is considerably reduced perhaps to as low as ten percent of the heat coming from point 23. In this manner, undesirable off-axis spontaneous emission depumping is prevented.

FIG. 4 shows another advantage of the liquid cladding disclosed in this application. An elliptical reflector 30 has a flash lamp 31, located at one principal focus, and a ruby rod 32 located at the other principal focus of the elliptical reflector 30. The liquid cladding 33 is provided about rod 32 and concentrates light coming from the flash lamp 31 into the rub rod in the following manner.

Assuming that the cladding is not present, light emitted from the flash lamp 31 could reach the ruby rod 32 directly along various paths defined by the lines 34, 35, 36, 37. With the addition of the liquid cladding 33 whose index of refraction is higher than that of the surrounding air, energy passing along the line designated by the number 38 will encounter the cladding 33 and will be refracted towards the ruby 32 as shown along dash line 39. In this manner the cladding provides a means for increasing the concentration of energy delivered to the ruby rod by the amount of light reaching the cladding within the angle 40. In a typical case a ruby rod may be one-fourth of an inch in diameter and the flash lamp three-fourth inches. Thus, with cladding the ruby is made to appear larger and hence is more easily balanced in the elliptical reflector as shown.

Fig. 5 generally shows a housing 50 having extending therefrom a pair of electrodes 51, 52 which provide electrical coupling means for applying power to a flash lamp as hereinafter described. A material to be lased 53 is shown encased within the housing and an end cap 54, joined to an end plate 55, has a hollow tubular extension 56 coupled to a flexible plastic or rubber hose connection 17 which provides for the admission of a liquid coolant into a chamber as hereinafter shown.

FIG. 6, a longitudinal sectional view along lines 6–6 of FIG. 5, shows in detail the construction of the laser system housing 50, having a second end plate 59, rigidly supports a flash lamp generally designated by the number 60. The lamp includes an inner cylindrical housing 61, an outer cylindrical housing 62 and a space 23 which is filled with a gas that will give off intense radiation near and in the optical bands. One such gas now used extensively is Xenon. Electrical connections are made to the flash lamp by the S-shaped metallic clamps 65, 66. Clamp 65 makes direct contact with electrode 52 while a strip line terminal 67 connects terminal 51 to clamp 66. A second end cap 70 having a cylindrical passage 71 therein is joined to the end plate 59. Similarly, end cap 54 has a cylindrical passageway 72, which is connected to tubular extensions 56. A hollow cylindrical member 73, having open ends 74, 75 joining passageways 71, 72 completely surrounds material or rod 53 which is to be lased and is interposed between the flash lamp 60 and material 53. A liquid 75a is circulated via rubber tubing 17, extension 56, through the member 73 and out through an exit port 80. In the embodiment shown in FIGS. 5, 6 and 7 the liquid cladding can be water or any mixture of well known coolants depending upon the selected temperature range of operation and its ability to withstand breakdown in close proximity to the flash lamp. In addition, the selection of a different material to be lased would require changes in the liquid composition for securing the necessary pass band to allow absorption of energy by the laser to cause population inversion and to prevent the deleterious effect of inverted energies.

Dielectric coatings 81, 82 and 83 are provided to aid in selectively passing radiation to the material to be lased.

Surrounding flash lamp 60 is an area or volume 85 designed to provide additional cooling of the device by passing a gas from an entrance port 86, about the tube 60 and out an exit port 87. As shown port 87 is exhausted to the atmosphere, however, if it is desired to reuse this cooling gas, an exit port may be provided so that a closed circulating system would exist. Since the cooling effected by the cooling gas in chamber 85 would tend to reduce the temperature of Xenon and prevent the lamp from firing, a few turns of nichrome wire 90 are provided to heat the Xenon gas to a suitable operating temperature. Terminals 91 and 92 are brought out through housing 50 via insulated connections to supply the necessary current to wire 90.

In operation, a high voltage supply is coupled to terminals 51, 52 and current is passed through the nichrome wire 90 to heat the Xenon. A coolant gas flows through chamber 85 and liquid coolant 75a is pumped through chamber 77. The Xenon flash lamp provides, when energized, sufficient electromagnetic radiation of a given spectral distribution as shown by curve 11 in FIG. 1 to cause material 53 to lase. The dielectric layers are selected so that the desired electromagnetic radiation to cause lasing action in the material 53 is passed inwardly towards that material and the undesired radiation, such as infrared, would be absorbed or reflected back towards the other chamber 85. Additionally, the liquid in chamber 71, that is the coolant liquid, is selected to have a pass band for radiation which would further prevent by absorption the infrared radiation form reaching the material to be lased. At the same time the desired frequency of radiation is allowed to reach the material 53. When sufficient energy is pumped to the laser material, that is, above threshold, lasing action is produced and a coherent electromagnetic radiation is emitted along the horizontal axis 100 of material 53.

Obviously many modifications and variations of the present invention are possible in the light of the above teachings. It is therefore to be understood that within the scope of the appended claims the invention may be practiced otherwise than as specifically described.

We claim:

1. An improved flash lamp for a laser system for generating electromagnetic radiation in specific selected bands for pumping a given laser material, comprising:
    a. an inner cylindrical wall adapted to hold a material to be lased;
    b. an outer cylindrical wall;
    c. first and second end members sealing said inner and outer walls and defining therewith a cylindrical volume;
    d. a gas in said volume capable, when energized, of producing radiation in a frequency spectrum including the selected bands for pumping said laser material;
    e. first and second electrode means coupled to said first and second end members for energizing said gas to emit radiation in said frequency spectrum; and
    f. an outer coating on said outer wall selectively reflecting said selected frequency bands and passing the balance of said frequency spectrum.

2. The improved flash lamp of claim 1 wherein there is provided means for circulating a cooling gas about said flash lamp to remove excess heat from said lamp.

3. The improved flash lamp of claim 1 wherein there is provided a heating means disposed about said outer cylindrical wall for heating said gas in said volume to a predetermined temperature condition, said gas in said volume to flash when energized through said electrodes.

4. The improved flash lamp of claim 1 wherein there is provided a cooling jacket disposed between said laser material and said flash lamp containing a liquid therein having a specific filter characteristic such that pumping radiation is permitted to pass from said gas to said laser material, said cooling jacket action as a heat sink for radiation from said flash lamp.

5. The improved flash lamp of claim 1 wherein there is provided an inner coating in juxtaposition with said inner cylindrical wall capable of passing said selected frequency bands and reflecting the balance of the frequency spectrum such that the pumping bands reach the material to be lased.